United States Patent [19]

Sasabe et al.

[11] Patent Number: 5,438,375
[45] Date of Patent: Aug. 1, 1995

[54] VIDEO SWITCHING CIRCUIT AND TELEVISION RECEIVER INCORPORATING THEREOF

[75] Inventors: Toru Sasabe, Minou; Emiko Sumi, Moriguchi, both of Japan

[73] Assignee: Matsushita Electric Industrial Co., Ltd., Kadoma, Japan

[21] Appl. No.: 73,749

[22] Filed: Jun. 8, 1993

[30] Foreign Application Priority Data

Jun. 8, 1992 [JP] Japan .................. 4-147258

[51] Int. Cl.⁶ .............................. H04N 5/268
[52] U.S. Cl. ........................ 348/706; 348/554
[58] Field of Search ............ 348/705, 706, 663, 668, 348/554; 358/31, 181; H04N 5/268, 9/64, 3/27

[56] References Cited

U.S. PATENT DOCUMENTS

| | | | |
|---|---|---|---|
| 4,802,000 | 1/1989 | Willis | 348/706 |
| 4,937,672 | 6/1990 | Anderson | 348/706 |
| 4,963,958 | 10/1990 | Sendelweck | 348/706 |
| 4,996,597 | 2/1991 | Duffield | 348/705 |
| 5,018,013 | 5/1991 | Rabii | 348/706 |
| 5,032,900 | 7/1991 | Sendelweck | 348/554 |
| 5,202,765 | 4/1993 | Lineberry | 348/706 |

FOREIGN PATENT DOCUMENTS

| | | |
|---|---|---|
| 0260861 | 3/1988 | European Pat. Off. . |
| 0455131A3 | 6/1991 | European Pat. Off. . |
| 0443966A1 | 8/1991 | France . |
| 4-64852(A) | 2/1992 | Japan . |
| 4-70267(A) | 3/1992 | Japan . |
| 4-108250(A) | 4/1992 | Japan . |

*Primary Examiner*—James J. Groody
*Assistant Examiner*—Chris Grant
*Attorney, Agent, or Firm*—Ratner & Prestia

[57] ABSTRACT

A video switching circuit is capable of switching between a Y/C separated video signal and a composite video signal. The video switching circuit includes a first and a second video input terminals. The Y/C separated video signal is inputted to said first video input terminal and plural composite video signals are inputted to the second video input terminal when these two types of video signal inputs are required. The circuit is equipped with a first and a second selector. One of the plural composite video signals inputted to the second video input is selected by the first selector. The selected composite video signal is separated into luminance and chrominance signals by a Y/C separator. As a result, the output of the Y/C separator and the signal inputted by the first video input are similar. Thus, these two signals can be alternatively switched by the second selector according to the control signal given by an appropriate controller.

8 Claims, 5 Drawing Sheets

VIDEO SWITCHING CIRCUIT AND TELEVISION RECEIVER INCORPORATING THEREOF

BACKGROUND OF THE INVENTION

This invention relates to a video switching circuit which conducts switching between a Y/C separated video signal in which a luminance signal and a chrominance signal are separated, plural composite video signals composed of the luminance signal and the chrominance signal, and a television receiver incorporating this video switching circuit.

Most modern television receivers are designed to display normal television signals received through their own tuner circuits as well as video signals produced by an independent audio-video (AV) apparatus. Television receivers are normally provided with input terminals to which a Y/C separated video signal (hereinafter this is referred to as S-video signal) produced by an independent AV apparatus is connected, in addition to plural input terminals to which plural composite video signals (hereinafter this is referred to as N-video signal) are connected.

The switching between these plural N-video signals connected to the input terminals of a television receiver has been performed by inputting, to the switching circuit, a keying signal such as the one produced by a remote controller.

However, when an S-video signal is connected to the television receiver, the connection is made at a terminal which is common to an N-video signal, and the switching circuit is designed to select the S-video signal preferentially.

The object of this preference is to simplify both the circuit construction and the switching operation of such. Therefore, this enables the connections of both the N-video signal and the S-video signal at a common input terminal, and the consistent display of the S-video signal having substantially better image quality than that of the N-video signal.

In addition to this, the conventional television circuit has been provided with an on-screen display circuit in order to display the type of the selected input video signal on the television screen. The display is then controlled by a micro-computer to which the information identifying the type of input signal is inputted.

A conventional circuit incorporating these features is shown in FIG. 6, wherein 1 is a microcomputer which controls the on-screen display circuit incorporated in the television receiver, 2 is an S-video signal input terminal, 3 is an analog switch IC to select a desired video signal (in this case, among four video signals including the video signals, i.e., AV1, AV2, AV3, and the TV signal), 4 is a circuit block to separate the Y/C video signal components, 5 is an analog switch IC to select either the N- or S-video signal, 6 is a video chrominance IC, 7 is a remote-controller, and 8 is a mixer to produce a signal commanding the analog switch IC 5 to switch to the S-video signal. This signal is produced by mixing a signal showing the presence of an S-video signal at the input terminal and a switching signal produced by the micro-computer 1.

Explaining in more detail the conventional circuit construction shown in FIG. 6, the circuit is equipped with three video input terminals named AV1, AV2, and AV3, respectively. In addition, the S-video signal inputted to the S-video signal input terminal 2 is at a video-signal selecting position which is shared with the input terminal AV2.

The switching between these inputted video signals is performed by means of a micro-computer 1 by which the analog switches IC3 and IC5 are controlled whenever a switching command from the remote-controller 7 is detected by the micro-computer 1.

The switching of the analog switch IC5 in this case is performed by a composite signal comprised of a signal from the micro-computer 1 and a signal from S-video signal input terminal 2. Although the microcomputer 1 may select the video input terminal AV2, it switches to the S-video signal automatically whenever the connection of the S-video signal to the input terminal 2 is detected.

Furthermore, since the signal informing the connection of the S-video signal to the input terminal 2 is fed back to the micro-computer 1, the micro-computer commands display of the type of inputted video signals (i.e. whether it is an N-video signal or an S-video signal) on the screen.

When the input terminal which is shared with the N-video signal and the S-video signal is selected, that is, when an N-video signal and an S-video signal are simultaneously inputted to the common input terminal, the S-video signal is preferentially selected by the video switching circuit incorporated in the conventional television receiver. Therefore, it is then impossible for users to select the N-video signal or the S-video signal by operating the remote-controller key.

However, since various video-software packages are now available to users, users may be dissatisfied by this video signal selection system by which the S-video signal with a higher image quality is preferentially selected ignoring the other N-video signals with lower image quality.

Moreover, since the information relating to the S-video signal selection is inputted to the micro-computer, the on-screen display (OSD) which shows the type of video input, i.e. whether it is an S-video signal or an N-video signal, has to be controlled by the micro-computer whenever the selection is made.

SUMMARY OF THE INVENTION

The present invention offers a new and simple video switching circuit by which optional switching between the N-video signal and the S-video signal inputs at a common terminal can be made.

The video signal switching circuit comprises:
first video signal input means to input a Y/C separated video signal of which the luminance signal and the chrominance signal are separated;
second video signal input means to input plural composite video signals composed of luminance signals and chrominance signals;
first selection means to select one of the plural composite video signals inputted by the second video signal input means;
Y/C separation means to separate the composite video signal selected by the first selection means into luminance signal and chrominance signal components;
second selection means by which the selection between the output of the Y/C separation means and the signal inputted by the first video signal input means is performed; and
control means to control the first and the second selection means.

Thus, the selection of a desired video input can be made with ease by means of the second selection means by which the output of the Y/C separation means and the video signal inputted by the first video input means, are alternatively switched by means of a control signal obtained by the control means.

Furthermore, this video signal switching circuit of the invention is equipped with a memory means to memorize the last switching state selected by the first and second selection means.

Therefore, when an input inputted by the second input means is selected by the first selection means, the selection means is controlled to make the control means to select automatically a state of the selection means memorized in the memory means in order to make an automatic selection of a desired type of video signal, such as the one having a higher image quality. Thus, the operability of the selection circuit is simple and high.

Moreover, since the television receiver incorporating this video switching circuit of the above construction is equipped with an instruction means by which the switching between the first and the second selection means are controlled, any desired video signal out of a plurality of video signals inputted thereto can be selected easily.

Since the instruction means is operated by a remote-control means, and since the selected state of the first and second selection is indicated on a display means on which the information memorized in the memory means is displayed, no particular control operation for displaying is required so that the circuit construction can be simplified.

With this video signal switching circuit to which two types of video signals, i.e., the Y/C separated video signal and the composite video signal can be inputted, the Y/C separated video signal is inputted to the first video signal input means while a plural number of the composite video signals are inputted to the second video signal input means.

Then, the selection of one of the plural composite video signals inputted to the second video signal input means is made by the first selection means, and the luminance and the chrominance signals contained in the selected composite video signal are separated by the Y/C separation means. Since both the output of the Y/C separation means and the signal inputted to the first video input signal means take a similar signal form, these two signals can be alternatively switched according to the second selection means. This switching operation, called toggle operation, can be realized by a simple circuit construction and a simple manual operation.

In order to improve the device operability further by taking the user's preferential behavior into consideration, a memory means memorizing the previous selection made by the first and second selection means is provided. Thus, if the first selection means selected an input for the second input, the second selection means is so controlled by the control means that the state of the second selection means memorized in the memory means is automatically selected.

For an instance, if the preferential selection had been made for higher image quality, this selection is stored in the memory means, so that the preferential selection of the video signal of higher image quality is automatically performed.

In addition to the above, the television receiver incorporating this video switching circuit is equipped with an instruction means by which one of the plural video signals inputted to the receiver can be selected with ease.

Moreover, since this operation can be made by a remote controller and the updated selection information stored in the memory means is displayed on the display means, the selecting operation can be made with improved ease with out requiring extra and special control operations.

DETAILED DESCRIPTION OF THE INVENTION

The characteristic features of the second selecting means which controls the output of the video switching circuit of the invention are to output two inputted video signals alternatively. That is, the output of the Y/C separation means and the video signal from the first video input means can be alternatively selected.

Therefore, with the television receiver equipped with a video signal input terminal switched by the switching circuit of the invention in addition to the plural video signal terminals, any one of the video input signals can be selected by the key operation of the remote controller.

In addition to the above, when the video signal input terminal to which both the N-video signal and the S-video signal signals are connected is switched by a remote control key which controls the second selection means, the N-video signal and the S-video signal can be alternatively switched (or selected in a toggling fashion) by operating the same remote controller key.

When a micro-computer is employed to control the television receiver incorporating the switching circuit of the invention, the switching operation in a toggling fashion (as above) can be performed by the key signals transmitted to the micro-computer from the remote controller.

Since the state of video selection between the S-video signal and the N-video signal is stored in the non-volatile memory means, and the last video signal selection can be read out of the memory (N-video signal or S-video signal) at a succeeding video selecting operation, the second selection means can be switched automatically according to this information. Moreover, based on the information stored in the non-volatile memory, an on-screen display which indicates the type of input signal (e.g. N-video signal or S-video signal) is possible.

A more concrete explanation is given below by referring to FIG. 1 which shows an exemplary embodiment of the invention.

Figure 1:
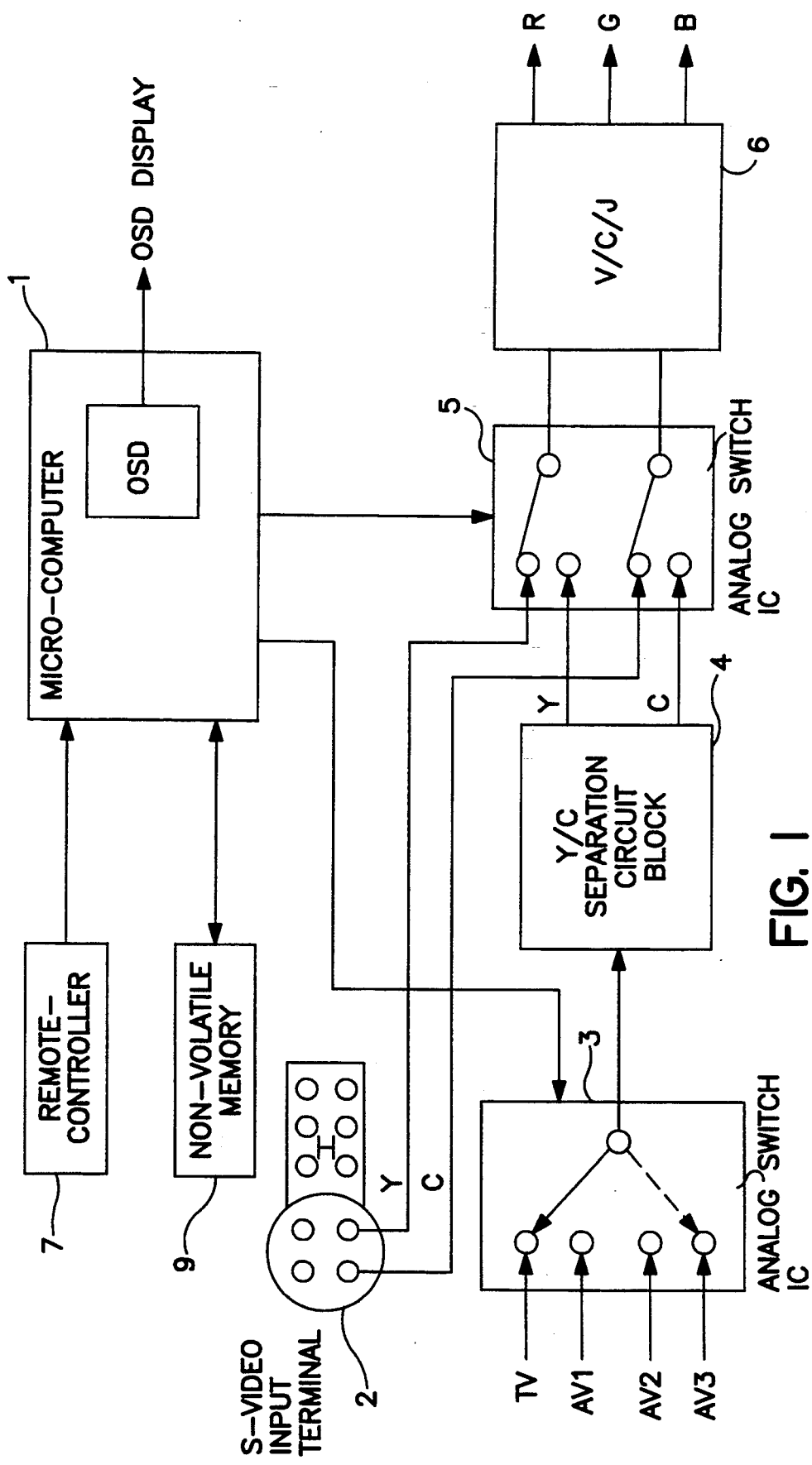
FIG. 1 shows a block diagram of an exemplary embodiment of the video signal switching circuit of the invention.

In FIG. 1, 1 is a micro-computer to control the television receiver in which the on-screen display circuit is incorporated, 2 is an input terminal to which an S-video signal is inputted, 3 is an analog switch IC by which the inputted video signals are switched (in this case, four video signals, AV1, AV2, and AV3 in addition to the television signal are switched), 4 is a Y/C separation circuit block, 5 is an analog switch to switch between the N-video signal and S-video signal, 6 is a chrominance IC, 7 is a remote-controller, and 9 is a non-volatile memory to memorize various information transmitted to the micro-computer 1.

In this case, the S-video signal inputted to the circuit is connected to a video selecting position which is shared with an N-video signal input terminal, or AV. No connection information relating the S-video signal transmitted to the terminal 2 need be fed to the micro-computer 1. All switching operations are controlled.

Figure 2:
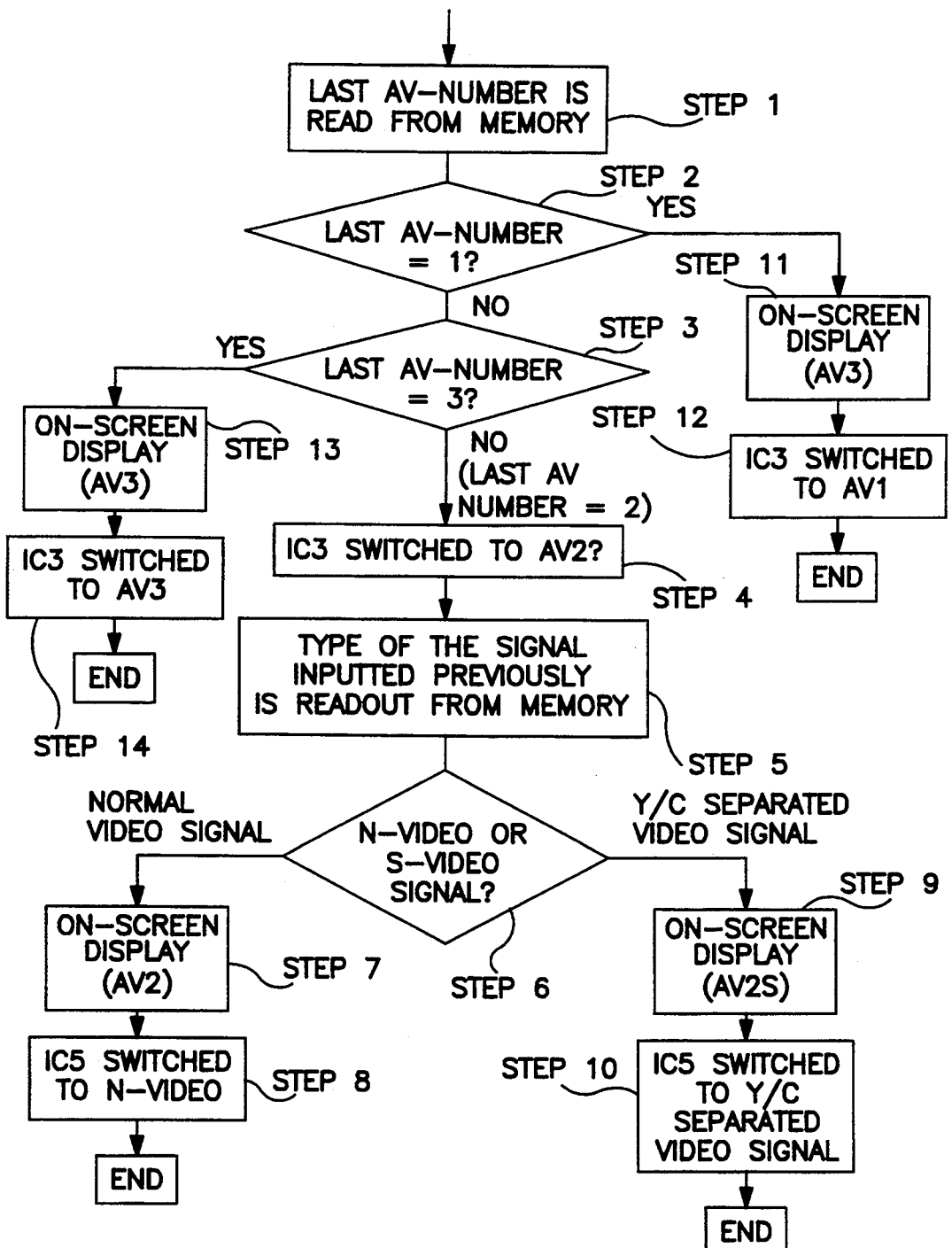
FIG. 2 shows a flow-chart diagram with regard to operation of the exemplary embodiment.
Figure 3:
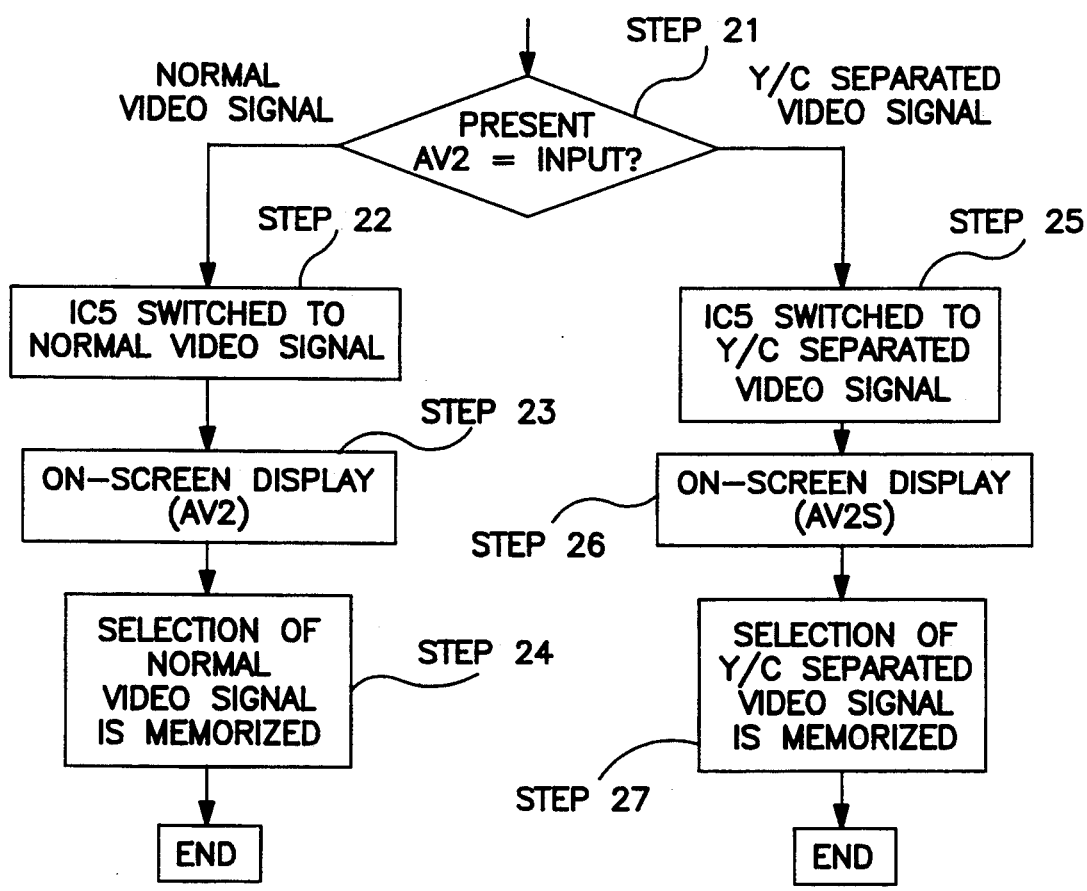
FIG. 3 shows another flow-chart diagram with regard to operation of the exemplary embodiment.

The circuit operation is explained referring to FIGS. 2 and 3. A video signal selection is first explained by referring FIG. 2. When a switching of the video input terminal AV2 to which an N-video signal is connected is instructed by an instruction signal transmitted from the remote-controller 7, the AV number which has been selected and previously stored in the non-volatile memory is read out by the micro-computer 1 (Steps 1 to 3). The analog switch IC3 then switches to AV2 (Step 4).

Since the S-video signal is assigned to the video input terminal AV2 also, the non-volatile memory is read in order to determine the type of the signal received previously by terminal AV2 (i.e. whether it is an N-video signal or an S-video signal) (Steps 5 to 10).

Then, the analog switch IC5 is switched to the output of the S-video signal input terminal 2 if it is an S-video signal, and it is switched to the output of the Y/C separation block if it is an N-video signal (Steps 7 to 10). This state of the analog switch IC5 is stored in the non-volatile memory 9 by means of the micro-computer 1, and, at the same time, it is displayed on the screen. The output of the analog switch IC 5 is fed to the video chrominance IC6, and the output of this is available as the desired video signal.

Figure 4:
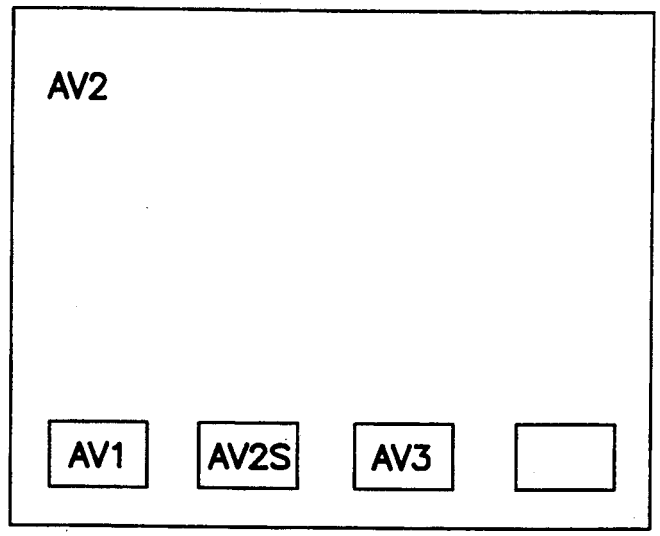
FIG. 4 shows an on-screen display when an N-video signal is selected in the exemplary embodiment of the invention.

That is, when the information indicating that an N-video signal had been previously selected is stored in the non-volatile memory 9, this fact is displayed on the screen by showing there (Step 7) as shown in FIG. 4, and the analog switch IC 5 is switched to the N-video signal (Step 8).

Figure 5:
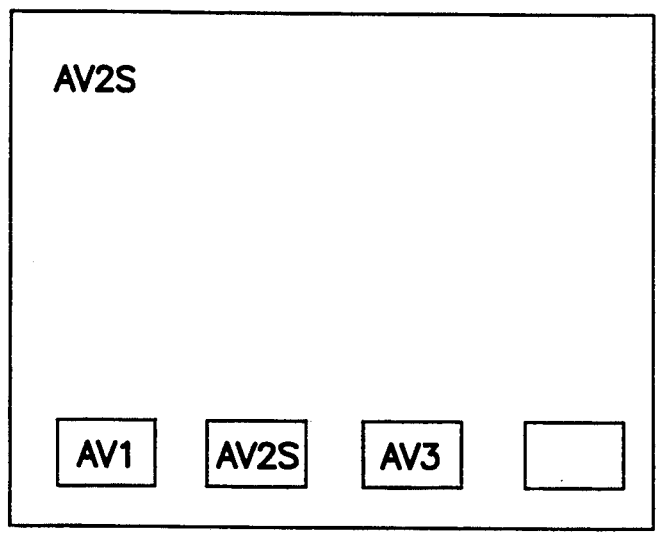
FIG. 5 shows an on-screen display when an S-video signal is selected in the exemplary embodiment of the invention.
Figure 6:
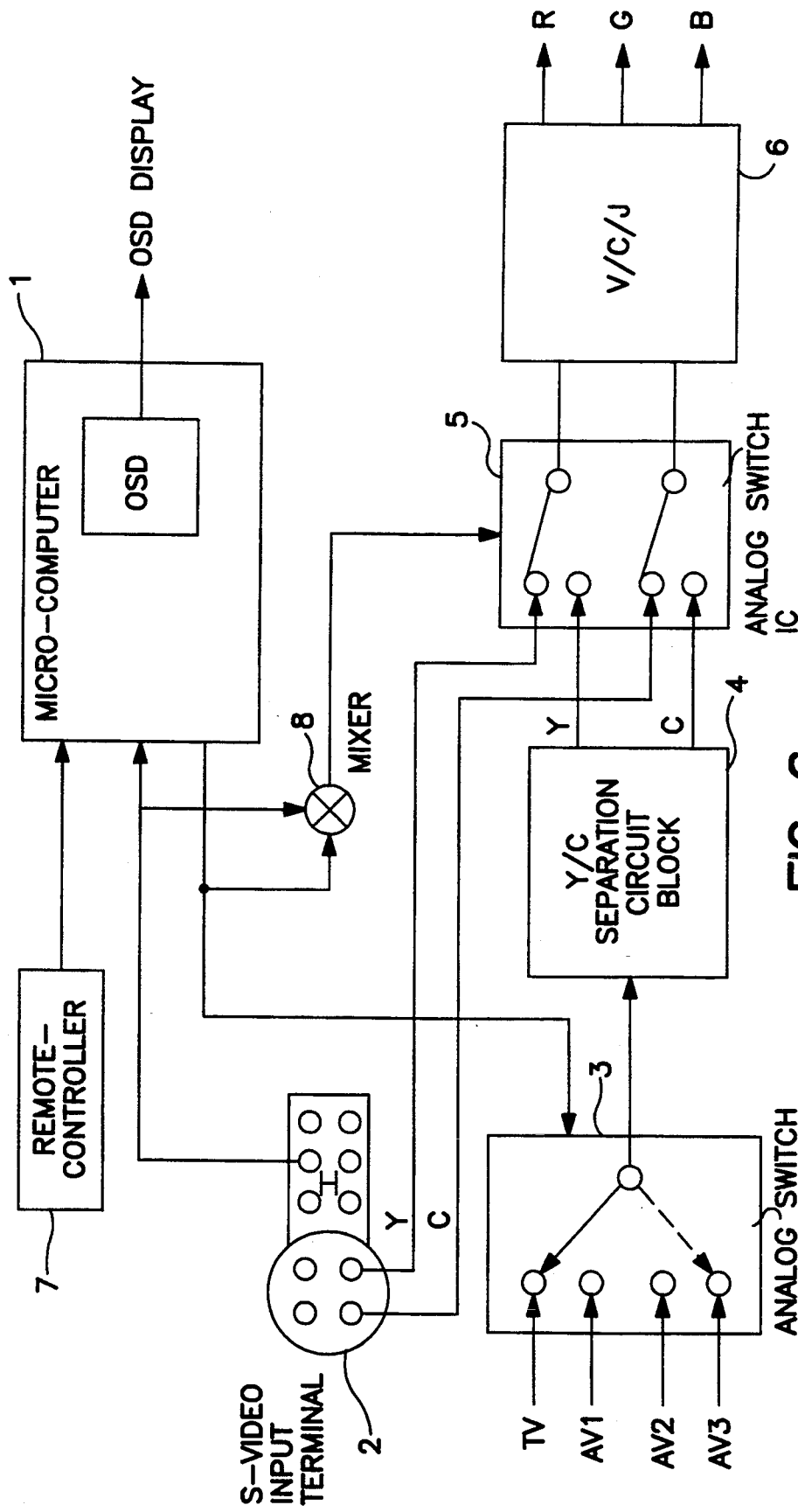
FIG. 6 shows a block diagram of a conventional video switching circuit.

On the other hand, when the information indicating that an S-video signal had been previously selected is stored in the non-volatile memory 9, this fact is displayed on the screen by the there (step 9) as shown in FIG. 5, and the analog switch IC5 is switched to the S-video signal (step 10).

It is also possible that the analog switch IC3 is switched to AV1 (Step 12). This fact is displayed on the screen (Step 11) if the state previously selected by the analog switch IC3 was the video input terminal AV1. On the other hand, when the analog switch IC3 is switched to AV3 (Step 14), this fact is displayed on the screen (Step 13) if the state previously selected by the analog switch IC3 was the video input terminal AV3.

The above-described video switching operation at the terminal AV2 and the operation of storing this information into the non-volatile memory 9 are now explained by referring FIG. 3.

As the switching between the N-video signal and the S-video signal is executed whenever an appropriate remote-control signal is received, if an N-video signal is desired, the analog switch IC5 is switched to the N-video signal (Step 22) and is displayed on the screen (Step 23), and the selection of the N-video signal is stored in the non-volatile memory 9 (Step 24).

Likewise, when an S-video signal is desired, the analog switch IC5 is switched to the S-video signal (Step 25), is displayed on the screen (Step 26), and the selection of the S-video signal is stored in the non-volatile memory 9 (Step 27).

As indicated above, since the last switching state is stored in the non-volatile memory 9, the micro-computer 1 is able to automatically select the state the user preferentially selected and the state previously selected even after the power is shut off and turned on again.

FIG. 4 shows an on-screen display with AV2 indicating that an N-video signal is selected, and FIG. 5 shows the on-screen display when AV2 showing S-video signal is selected. The colored displays of "AV1", "AV2/S", "AV3", and "(blank)" shown in FIGS. 4 and 5 are to show the video inputs available to the user, and the colors such as red, green, yellow, and cyan which are similar to the colors allocated to the remote controller are used here.

Since all of the switching operations of the analog switch IC5 are controlled by the micro-computer 1, the mixer 8 shown in the conventional circuit is not required. In addition, since the display of S-video signal or N-video signal input is made based on the input signal from the S-video signal input terminal in the conventional circuit, this is now performed by an instruction from the micro-computer 1. Thus, the input terminal of the micro-computer is not required in the circuit of the invention.

As indicated above, the video switching circuit and the television receiver employing this circuit, are each equipped with terminals for both the N-video signal and the S-video signal, and the input of either the N-video signal or the S-video signal can be arbitrarily selected by a simple switching operation of the remote controller. Therefore, the video switching can be accomplished using a simple switching circuit. Moreover, this may be equivalent to an increased number of video selections. For instance, even if input signals from the other video sources are inputted to AV2 and AV2S, either one of these input signals can be selected. In this manner, the above described advantages of the switching circuit of the present invention are realized.

What is claimed:

1. A video switching circuit comprising:
    first video signal input means for generating a Y/C separated video signal having a luminance signal and a chrominance signal, said luminance signal and said chrominance signal separated;
    second video signal input means for generating a plurality of composite video signals each one of said plurality of composite video signals including a respective luminance signal and a respective chrominance signal;
    first selection means for selecting one of said plurality of composite video signals generated by said second video signal input means;
    Y/C separation means for separating said one of said plurality of composite video signals selected by said first selection means into said respective luminance signal and said respective chrominance signal to produce a separated composite signal and for providing said separated composite signal at an output;

second selection means for selecting between said separated composite signal from said Y/C separation means and the Y/C separated video signal generated by said first video signal input means; and control means for generating a control signal to control said first and said second selection means;

wherein said second selection means alternatively switches between said separated composite signal and said Y/C separated video signal in response to said control signal independently of said first selection means selecting one of said plurality of composite video signals.

2. A video switching circuit according to claim 1, further including:

memory means for storing one of a plurality of states corresponding to each of the first and the second selection means;

wherein said control means selects one of said plurality of states corresponding to said second selection means stored in said memory means when said first selection means selects a desired input for said second input means.

3. A video switching circuit according to claim 2, wherein said memory means is a non-volatile memory.

4. A video switching circuit according to claim 2, wherein one of said plurality of states corresponding to said first selection means and another one of said plurality of states corresponding to said second selection means are maintained following power interruption.

5. A television receiver including a video switching circuit and an instruction means to control said video switching circuit, said video switching circuit comprising:

first video signal input means for generating a Y/C separated video signal having a luminance signal and a chrominance signal, said luminance signal and said chrominance signal being separated;

second video signal input means for generating a plurality of composite video signals each one of said plurality of composite video signals including a respective luminance signal and a respective chrominance signal;

first selection means for selecting one of said plurality of composite video signals generated by said second video signal input means;

Y/C separation means for separating said one of said plurality of composite video signals selected by said first selection means into said respective luminance signal and said respective chrominance signal to produce a separated composite signal;

second selection means for selecting between said separated composite signal from said Y/C separation means and the Y/C separated video signal generated by said first video signal input means; and control means for generating a control signal to control said first and said second selection means;

wherein said second selection means alternatively switches between said separated composite signal and said Y/C separated video signal in response to said control signal independently of said first selection means selecting one of said plurality of composite video signals; and said first and said second selection means are controlled by said instruction means.

6. A television receiver according to claim 5, wherein said instruction means is a remote control device.

7. A television receiver according to claim 5, further including display means to display a selection state of said first selection means and a selection state of said second selection means.

8. A television receiver according to claim 5, wherein said video switching circuit includes a non-volatile memory in which the selection of said second selection means is stored, wherein said stored selection is read during video switching.

* * * * *